May 30, 1961 J. J. BLACK 2,986,408
REVERSIBLE SEMI-TRAILER CONSTRUCTION
Filed Aug. 1, 1960 3 Sheets-Sheet 1
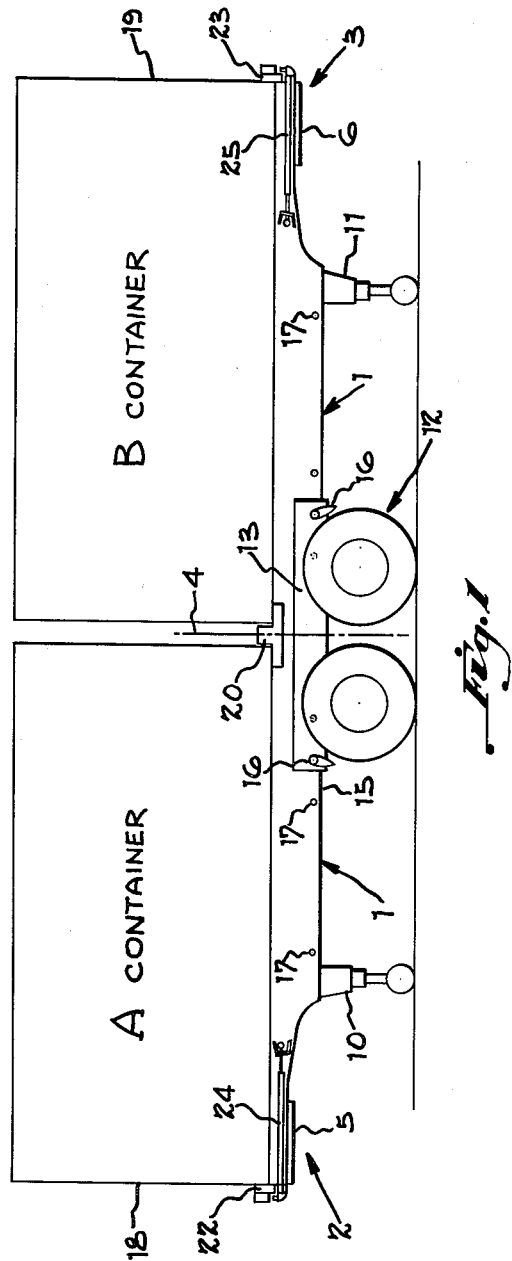
INVENTOR.
James J. Black.
BY Wood, Herron & Evans.
ATTORNEYS.

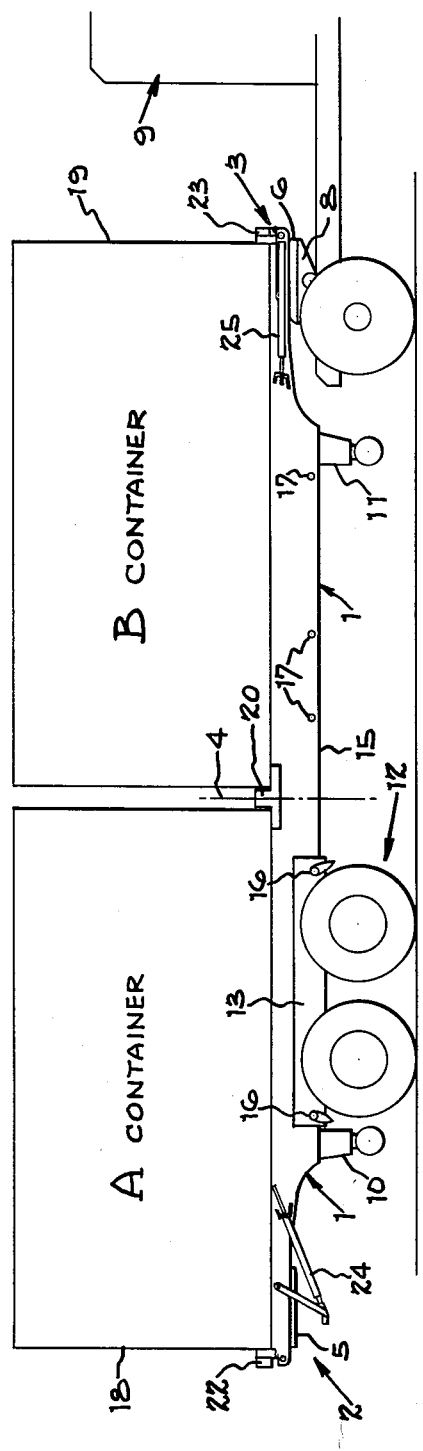

United States Patent Office 2,986,408
Patented May 30, 1961

2,986,408
REVERSIBLE SEMI-TRAILER CONSTRUCTION
James J. Black, Cincinnati, Ohio, assignor to Trailmobile Inc., Cincinnati, Ohio, a corporation of Delaware
Filed Aug. 1, 1960, Ser. No. 46,651
9 Claims. (Cl. 280—423)

This invention relates to roadway vehicles, and in particular to a reversible trailer which is generally of the semi-trailer type but whch is adapted to be loaded, unloaded and drawn from either end.

The conventional semi-trailer comprises a cargo body mounted to a chassis having a set of two or more wheels at or adjacent one end and having a draft connection referred to as an "upper fifth wheel" at the opposite end which is engageable with a mating "lower fifth wheel" of a tractor unit, so that the semi-trailer may be connected to the tractor for transit and detached from it when not in use or during loading and unloading. Props or landing gear adjacent the upper fifth wheel can be lowered from the chassis to support the front end of the semi-trailer when it is disconnected from the tractor. The cargo body or container is conventionally equipped with a pair of loading doors at its aft end, i.e., at that end which is opposite from the upper fifth wheel.

In accordance with modern freight lading techniques, the conventional semi-trailer is usually backed up to a loading dock by a tractor so that freight may be first loaded into the "nose," or front, portion of the cargo body and then into the after part of the body, the space immediately adjacent the loading doors being laden last. Inherently the freight must be removed in reverse order: the freight which was last loaded, and consequently is adjacent the doors, is first unloaded. This sequence of loading and unloading operations is inevitable in the conventional semi-trailer because of the tractor connection at the front end.

When a conventional semi-trailer is laden with freight all of which is being shipped to the same destination, the order of loading or unloading the freight usually is of little consequence. The order of loading and unloading becomes important, however, where the cargo comprises two less-than-full loads (known as "LTL's") which are to be loaded and/or unloaded at different locations. In such instances the semi-trailer must be loaded so that the lading to be first unloaded will be adjacent the doors and accessible for unloading; in other words, that lading must be loaded last, else other cargo will have to be unloaded and then later reloaded into the trailer. But it frequently happens that the LTL which is to be unloaded first must also be loaded first, because of the relationship of the starting point of the trailer to the sites at which the cargo is to be picked up, which renders double handling of the other cargo unavoidable. Obviously, such double handling of freight is inefficient inasmuch as it is time consuming and laborious and, moreover, it may result in damage to the freight.

The problem of multiple handling of freight is especially serious where several LTL's are carried in a modern, large capacity, semi-trailer of the conventional type on a long haul from several different pick-up points to several different destinations. The economic advantage of using a large capacity trailer is, in fact, lost to a considerable extent by the unavoidable necessity of breaking down the load a large number of times as cargo is to be unloaded. The magnitude of the additional labor involved, as well as the time lost, will be particularly apparent in view of the frequent practice of routing trailers over a roughly circular trip on which cargo is picked up and discharged at a number of different locations along the way.

The trailer of the present invention is a semi-trailer which, in contrast to semi-trailers of the conventional type, is reversible, so that it may be loaded and unloaded from either end, and which, moreover, can be drawn from either end by a tractor or other towing vehicle, whereby either end of the trailer may be backed up to a dock and whereby double handling of LTL's is entirely obviated.

The semi-trailer of the present invention comprises a chassis having a draft connection and a lowerable support at each end, a wheel suspension which is longitudinally shiftable along the chassis, and cargo-housing means mounted to the chassis having doors which face outwardly from both ends of the semi-trailer for loading and unloading.

The invention can best be further described with reference to the accompanying drawings, in which:

Figure 1 is a side elevation of a preferred semi-trailer embodying the principles of this invention, showing the wheel suspension centered in neutral position with both landing gear lowered;

Figure 2 is a side view of a semi-trailer of the preferred type shown in Figure 1 having its right upper fifth wheel connected to the lower fifth wheel of a tractor with both landing gear raised and with the wheel suspension positioned at the left end of the chassis for roadway operation;

Figure 4:
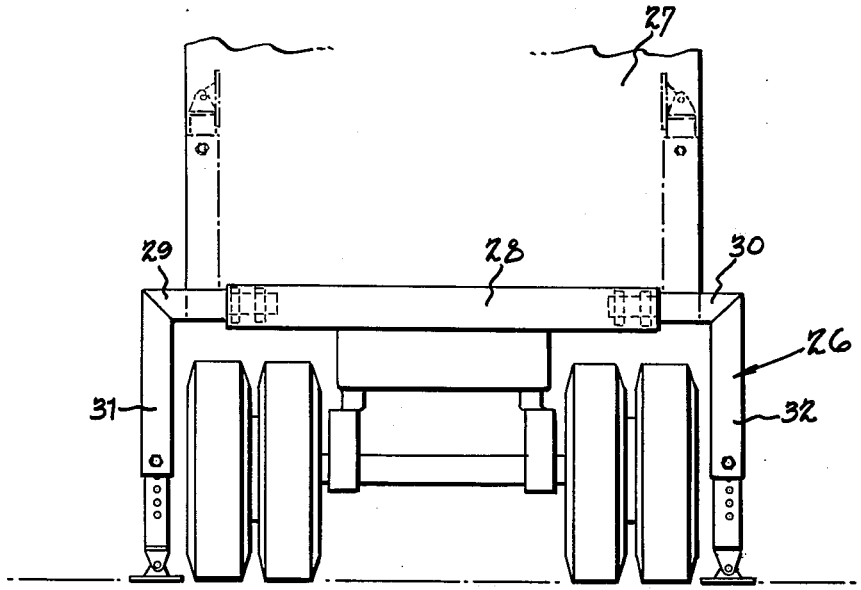
Figure 4 is an end view of the modified embodiment of the invention shown in Figure 3 showing the landing gear in both the lowered and raised positions.

The cargo-housing means of the semi-trailer of this invention may comprise, for example, a unitary cargo body which is integral with the chassis and which has loading doors at each end. Preferably, however, the cargo-housing means comprise a plurality of smaller separate cargo containers each having loading doors at least at one end and removably mounted on the trailer chassis in such arrangement that the doors face outwardly from the ends of the chassis. Cargo containers of this preferred type are shown in the drawings, but it will be understood that the semi-trailer is not limited to use with such cargo containers alone and that the invention encompasses other cargo-housing means which present loading entrances at both ends of the trailer.

In Figures 1 and 2 of the drawings, a semi-trailer is shown having a chassis 1 the left end of which is designated as 2 and the right end of which is designated as 3. In its simplest form the chassis may be symmetrical about a transverse vertical plane passing through its midsection 4. At each end 2 and 3 the chassis 1 is provided with a draft connection whereby it may be coupled to a tractor or other automotive vehicle. The draft connections preferably comprise upper fifth wheels 5 and 6 respectively which are engageable with a cooperating lower fifth wheel 8 of a tractor 9, as shown in Figure 2. The specific construction of the cooperable fifth wheel elements may be conventional and is not shown in detail in the drawings.

Adjacent each end 2 and 3, but inwardly of the upper fifth wheels 5 and 6 (i.e., toward the midstation 4 of the chassis), the chassis 1 is provided with two spaced sets of props on either (or both) of which the trailer may be supported when disconnected from the tractor 9. In the embodiment of the invention shown in Figures 1 and 2, these props comprise conventional retractable landing gears, the left landing gear being designated as 10 and the right as 11. In Figure 1 both landing gears 10 and 11 are shown in lowered position in which they support the chassis above the ground, while in Figure 2 both are shown in raised position, as in transit. As noted, the construction of the landing gears themselves may be conventional, and therefore has not been shown in detail.

The trailer chassis 1 is provided with a wheel suspension 12 which includes conventional brakes and which is longitudinally shiftable with respect to the chassis between the two landing gears 10 and 11, from a neutral position shown in Figure 1, in which the suspension 12 is positioned at the midsection 4 of the chassis, to operating positions in which it is positioned adjacent one or the other landing gear 10 or 11, as shown in Figure 2. In the preferred embodiment of the invention, as shown in the drawings, the wheel suspension 12 comprises a tandem axle arrangement including two pairs of wheels connected to a shiftable frame 13 which engages the underportion 15 of the chassis, but it will be understood that single axle suspension may be used where permissible under given axle load limitations. The frame 13 is positionable with respect to the chassis by suitable means such as locking bars 16 which are engageable with openings 17 spaced along the length of the chassis.

A pair of cargo containers, designated A and B in the drawings, are mounted on the chassis in back-to-back relationship, cargo container A having loading doors at its left end 18, cargo container B having loading doors at its right end 19. Preferably but not necessarily the cargo containers A and B are unitary structures and are removable from the chassis, so that they can be transferred directly to a railway car or ship. The containers A and B are positioned on the chassis between a central mounting 20 and end mountings 22 and 23.

The trailer is fitted at ends 2 and 3 with retractable bumpers 24 and 25 respectively, these being shown in raised position in Figure 1 and the left bumper 24 being shown in lowered position in Figure 2 for roadway operation. The conventional lights, reflectors, and air and electrical connections are also provided at each end of the trailer.

From the foregoing it will be apparent that the trailer is adapted to be loaded at either end and connected to and drawn by a tractor at the opposite end. Thus, as shown in Figure 2, the trailer is connected to a tractor 9 at its right end 3, and is loadable and unloadable at its left end 2 through the doors of container A. By shifting the wheel suspension 12 to the right from the position shown in Figure 2 past the neutral position shown in Figure 1, to a position inwardly adjacent right landing gear 11, and then connecting the tractor 9 to the left upper fifth wheel 5, the trailer can be drawn from its left end and container B loaded or unloaded through the doors at its right end 19. By this arrangement I have provided a reversible semi-trailer capable of carrying two LTL's which can be loaded and/or unloaded in any order desired. Thus, suppose that container A is to be laden at one destination with a first LTL. The trailer is connected in the manner shown in Figure 2 so that the doors of container A can be positioned adjacent a loading dock. The trailer can then be drawn to a second location where the suspension 12 is shifted to the position opposite that shown in Figure 2, so that it is inwardly adjacent the right landing gear 11, and the tractor connected to the left upper fifth wheel 5 so that the B container can be loaded. Either container A or B may be unloaded first as desired, simply by so shifting the suspension that the trailer can be drawn and positioned at a dock from the other end, opposite that at which unloading is to occur. The two separate cargo containers A and B of the preferred embodiment have the further advantage that they comprise "packages" which can be directly transferred to or from the trailer chassis without handling or disturbing cargo in them. The two symmetrically arranged landing gears 10 and 11 are provided so that the chassis will be evenly balanced and supported when the position of the wheel suspension 12 is being shifted from one end of the trailer to the other.

To further illustrate the reversibility of the unit, it may be assumed, for example, that the trailer is connected to a tractor at its right end 3, as shown in Figure 2, and that it is desired to reverse the direction of draft so that the trailer is connected at its left end 2 to the tractor. To do this, the left bumper 24 is raised and the wheel brakes are locked so that the wheels cannot roll. The tractor is backed up, that is, is moved to the left in Figure 2, so that the chassis 1 is shifted to the left relative to the wheels, until the wheels are in neutral position. Both landing gears 10 and 11 are lowered, so that the trailer appears as in Figure 1. The tractor is then disconnected from the right upper fifth wheel 11 and is driven to the opposite end (2) of the trailer, and is there connected to the left upper fifth wheel 5. The props are then raised, and with the wheels locked, the chassis is pulled further to the left until the suspension 12 is adjacent the right landing gear 11. The suspension is locked in place by appropriately engaging the locking bars 16 in chassis openings 17. After lowering the right bumper 25, the hook up is complete. The B container can now be backed into a dock and loaded or unloaded, or the trailer may be driven to a new location. The trailer can be returned to its orignal position by reversing the procedure outlined.

Figure 3:
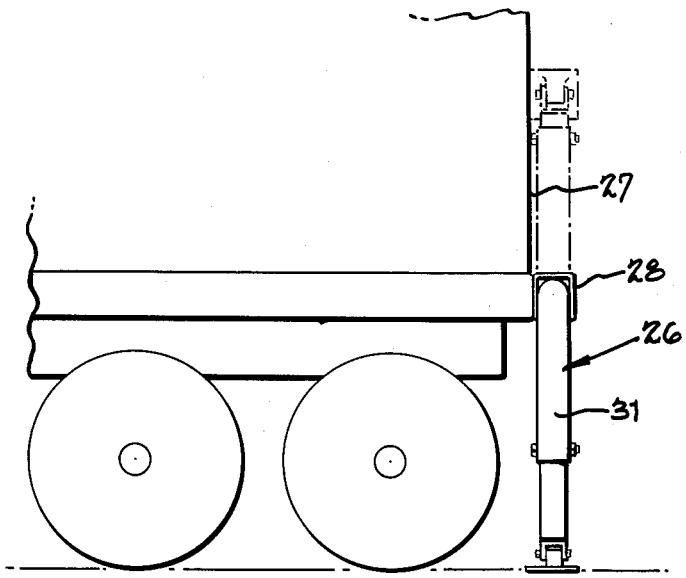
Figure 3 is a partial side elevation of a modified embodiment of the invention in which the landing gear are so arranged that the suspension can be shifted the entire length of the chassis.

In that embodiment of the invention which is shown in Figures 1 and 2, the landing gear 10 and 11 are secured to the chassis inwardly of the upper fifth wheels 5 and 6 respectively in such manner as to restrict or limit the scope of the longitudinal movement of the suspension with respect to the chassis. In Figures 3 and 4 is shown a modification of the invention in which the landing gear are of a construction such that they do not limit the longitudinal movability of the suspension along the underside of the chassis. Thus, in Figures 3 and 4, landing gear 26 is positioned at the end 27 of the chassis, outwardly of the draft connection (not shown). The landing gear 26 may comprise, for example, a hollow member 28 secured to the chassis at the end 27 of the trailer into which member are telescopingly received arms 29 and 30 extending right angularly from adjustable supports 31 and 32. The length of arms 29 and 30 is preferably such that the spacing of supports 31 and 32 is greater than the outside width of the suspension, as shown in Figure 4, and provides clearance for the tractor to engage the upper fifth wheel or other draft connection between the supports. The raised position of the landing gear 26 is indicated by the dotted lines in Figures 3 and 4; the supports 31 and 32 are swung upwardly and the arms 29 and 30 are telescoped into member 28, so that the supports are positioned out of the way against the end 27 of the cargo body. A similar landing gear is provided at the other end of the trailer (not shown).

The invention also encompasses that modification wherein two landing gear of the type shown in Figures 3 and 4, or an equivalent type, are mounted inwardly of the ends of the trailer, rather than immediately at the ends, whereby the suspension is shiftable over the entire length of the chassis along its underneath side, past the landing gears.

The operation of these modified embodiments of the invention is substantially similar to that already described, but provides the additional advantage of relatively greater adjustability of the suspension along the chassis to balance the load.

Thus, this invention provides a trailer having a single suspension like the conventional semi-trailer, yet is adapted for draft and lading from either end whereby multiple handling of cargo is greatly reduced or entirely obviated.

Having described my invention, I claim:

1. A reversible semi-trailer comprising a chassis, cargo-housing means mounted to said chassis, and suspension for said chassis comprising a single set of wheels, said chassis having adjacent each end thereof a draft connection and a prop, said cargo-housing means presenting a loading entrance at each end of said semi-trailer, said suspension being longitudinally shiftable along said chassis between positions serving either end thereof, whereby said semi-trailer may be drawn from either end and may be loaded and unloaded with freight from the end opposite to that from which it is drawn.

2. A roadway cargo vehicle for systematized use with a freight loading and unloading dock and a tractor vehicle having a lower fifth wheel, said cargo vehicle comprising a chassis having, adjacent each end, an upper fifth wheel adapted for engagement with the lower fifth wheel of said tractor vehicle and a prop for supporting that end of the cargo vehicle when it is not supported by said tractor vehicle, said chassis having one set of wheel suspension means for supporting the same from a roadway, said suspension means being shiftable longitudinally of said chassis between positions serving either end of said chassis, and cargo-housing means mounted on said chassis and having lading access openings at each end of said cargo vehicle whereby either end of said cargo-housing means may, upon connection of said tractor vehicle to the respectively opposite end of said chassis, be presented to a loading dock for loading and unloading of cargo between said dock and said cargo-housing means without discrimination as to the order of loading or unloading while the respectively opposite end of said chassis is supported on the prop adjacent such end during said loading or unloading of said cargo-housing means.

3. A roadway cargo vehicle for systematized use with a freight loading and unloading dock and a tractor vehicle having a lower fifth wheel, said cargo vehicle comprising a chassis having, adjacent each end, an upper fifth wheel adapted for engagement with the lower fifth wheel of said tractor, a retractable bumper, and a prop for supporting that end of the cargo vehicle when it is not supported by said tractor, said chassis having one set of wheel suspension means for supporting the same from a roadway, the said suspension means being shiftable longitudinally of said chassis to serve either end of said chassis, and cargo-housing means mounted on said chassis having lading access openings at each end of said cargo vehicle whereby either end of said cargo-housing means may, upon connection of said tractor to the respectively opposite end of said chassis, be presented to a loading dock for loading and unloading of cargo between said dock and said cargo-housing means while the said respectively opposite end of said chassis is supported on the prop adjacent such end during the said loading or unloading of said cargo-housing means.

4. A roadway cargo vehicle for systematized use with a freight loading and unloading dock and a tractor vehicle having a lower fifth wheel, said cargo vehicle comprising a chassis having, adjacent each end, an upper fifth wheel adapted for engagement with the lower fifth wheel of said tractor and a prop for supporting that end of the cargo vehicle when it is not supported by said tractor, said chassis having a single tandem axle wheel suspension for supporting the same from a roadway, said suspension being shiftable longitudinally of said chassis to serve either end of said chassis, and cargo container means mounted on said chassis and having lading access openings at each end of said cargo vehicle whereby either end of said cargo container means may, upon connection of said tractor to the respectively opposite end of said chassis, be presented to a loading dock for loading and unloading of cargo between said dock and said container means while the said respectively opposite end of said chassis is supported on the prop adjacent such end during the said loading or unloading of said cargo container means.

5. A roadway cargo vehicle for systematized use with a freight loading and unloading dock and a tractor vehicle having a lower fifth wheel, said cargo vehicle comprising a chassis having, adjacent each end, an upper fifth wheel adapted for engagement with the lower fifth wheel of said tractor and a prop for supporting that end of the cargo vehicle when it is not supported by said tractor, said chassis having one set of wheel suspension means for supporting the same from a roadway, said suspension means being shiftable longitudinally of said chassis between positions respectively serving either end of said chassis, and two cargo containers removably mounted on said chassis in end-to-end relation, each cargo container having a lading access opening facing outwardly from the end of said cargo vehicle whereby either of said cargo containers may, upon connection of said tractor to the respectively opposite end of said chassis, be presented to a loading dock for loading and unloading of cargo between said dock and said container while the said respectively opposite end of said chassis is supported on the prop adjacent such end during the said loading or unloading of said cargo container.

6. A reversible semi-trailer comprising a chassis having a draft connection and a prop adjacent each end, cargo-housing means mounted on said chassis and presenting a loading entrance at each end of said semi-trailer, a single set of wheels, said wheels being longitudinally shiftable with respect to said chassis between positions serving each end thereof, brake means for locking said wheels against rotation to permit said chassis to be shifted longitudinally with respect to said wheels by draft means connected to either draft connection, whereby said semi-trailer may be drawn from either end and may be loaded with freight from the end opposite to that from which it is drawn.

7. A reversible semi-trailer comprising a chassis, two cargo containers removably mounted to said chassis in end-to-end arrangement thereon, and a tandem suspension, said chassis having an upper fifth wheel and a vertically adjustable prop at each end thereof, said props being spaced inwardly of said upper fifth wheels, each cargo container having a loading door facing outwardly from its respective end of said semi-trailer, said suspension being longitudinally shiftable with respect to said chassis between said props, whereby said semi-trailer can be drawn from either end and whereby each said cargo container can be loaded and unloaded from the end of said semi-trailer opposite to that end from which said semi-trailer is drawn.

8. A reversible semi-trailer comprising, a cargo-carrying frame, two cargo containers mounted to said frame in end-to-end relation thereon, said containers having end doors, said frame having a fifth wheel connecting structure and a set of landing gears at each end, and a wheeled suspension, said suspension being shiftable between said landing gears on said frame to permit selective loading and unloading of said containers through said doors.

9. A reversible semi-trailer comprising, a cargo-carrying frame, two cargo containers mounted to said frame in end-to-end relation thereon, said containers having end doors, said frame having a fifth wheel connecting structure and a set of landing gears at each end, and a wheeled suspension, said suspension being shiftable from one end of said frame to the other along the underside thereof to permit selective loading of said containers through said doors.

References Cited in the file of this patent

UNITED STATES PATENTS

| | | |
|---|---|---|
| 2,369,384 | Zubatsky | Feb. 13, 1945 |
| 2,590,962 | Gurton et al. | Apr. 1, 1952 |
| 2,703,659 | Hutchins | Mar. 8, 1955 |
| 2,841,094 | Schumacher | July 1, 1958 |
| 2,847,137 | Stringfellow | Aug. 12, 1958 |

FOREIGN PATENTS

| | | |
|---|---|---|
| 24,489/35 | Australia | Sept. 4, 1936 |